United States Patent [19]

Wargo

[11] Patent Number: 4,464,679
[45] Date of Patent: Aug. 7, 1984

[54] METHOD AND APPARATUS FOR OPERATING A MICROPROCESSOR IN SYNCHRONISM WITH A VIDEO SIGNAL

[75] Inventor: Robert A. Wargo, Ringoes, N.J.

[73] Assignee: RCA Corporation, New York, N.Y.

[21] Appl. No.: 280,475

[22] Filed: Jul. 6, 1981

[51] Int. Cl.³ .......................................... H04N 5/04
[52] U.S. Cl. .................................. 358/148; 358/149; 358/153
[58] Field of Search ............... 358/142, 147, 148, 149, 358/150, 152, 153, 158, 188; 340/721, 750

[56] References Cited

U.S. PATENT DOCUMENTS

| | | | |
|---|---|---|---|
| 3,878,335 | 4/1975 | Balaban | 358/148 |
| 3,898,377 | 8/1975 | Fairbairn | 358/148 |
| 3,909,839 | 9/1975 | Inaba et al. | 358/8 |
| 3,982,064 | 9/1976 | Barnaby | 358/147 |
| 4,028,695 | 6/1977 | Saich | 340/365 R |
| 4,092,672 | 5/1978 | Aschwanden | 358/149 |
| 4,216,396 | 8/1980 | Balaban et al. | |
| 4,245,251 | 1/1981 | Steckler et al. | 358/139 |
| 4,251,833 | 2/1981 | Fernsler et al. | 358/148 |
| 4,270,145 | 5/1981 | Farina | |
| 4,276,564 | 6/1981 | Watson et al. | 358/158 |
| 4,281,345 | 7/1981 | Wärn | |
| 4,346,407 | 8/1982 | Baer et al. | 358/149 |
| 4,366,498 | 12/1982 | Theriault | 358/38 |
| 4,384,306 | 5/1983 | Liu | 358/166 |

FOREIGN PATENT DOCUMENTS

| | | |
|---|---|---|
| 2931758 | 2/1981 | Fed. Rep. of Germany . |
| 1195388 | 6/1970 | United Kingdom . |
| 1285221 | 8/1972 | United Kingdom . |
| 1308208 | 2/1973 | United Kingdom . |
| 2056801 | 3/1981 | United Kingdom . |

OTHER PUBLICATIONS

Frequency Synthesizers Theory and Design, by Vadim Manasswitsch, John Wiley & Sons, 1976, pp. 283–285.
Industrial Electronics Design and Application, by Charles A. Davis, Charles E. Merrill Publishing Co., Columbus, Ohio, 1973, pp. 206–207.
TK-47 Color Camera, 1978, IB-70613, Figures 2-1, 11-1, IB-70919, Figure 1, IB-70931, Figures 1,3.
Intel Data Catalog, 1977, pp. 8-4, 8-5, 8-11 and 8-12.

*Primary Examiner*—Tommy P. Chin
*Attorney, Agent, or Firm*—Paul J. Rasmussen; Peter M. Emanuel; Joseph J. Laks

[57] ABSTRACT

A microprocessor is provided in a television receiver which is responsive to a clock signal phase locked to a recurrent signal component of a composite video signal, such as a horizontal line rate signal component. The clock signal frequency is chosen to be an integer multiple of the recurrent signal component and to enable the microprocessor to execute an integer number of uniform instruction cycles during an integer number of periods of the recurrent signal component. The execution of the instruction cycles is brought into a real time phase alignment with the recurrent signal component by causing the microprocessor to execute an instruction during a time interval which is greater than the time required to execute one of the uniform insturction cycles. The phase of subsequently executed uniform instruction cycles is shifted in this manner until signal sampling indicates that the desired phase relationship has been achieved.

18 Claims, 17 Drawing Figures

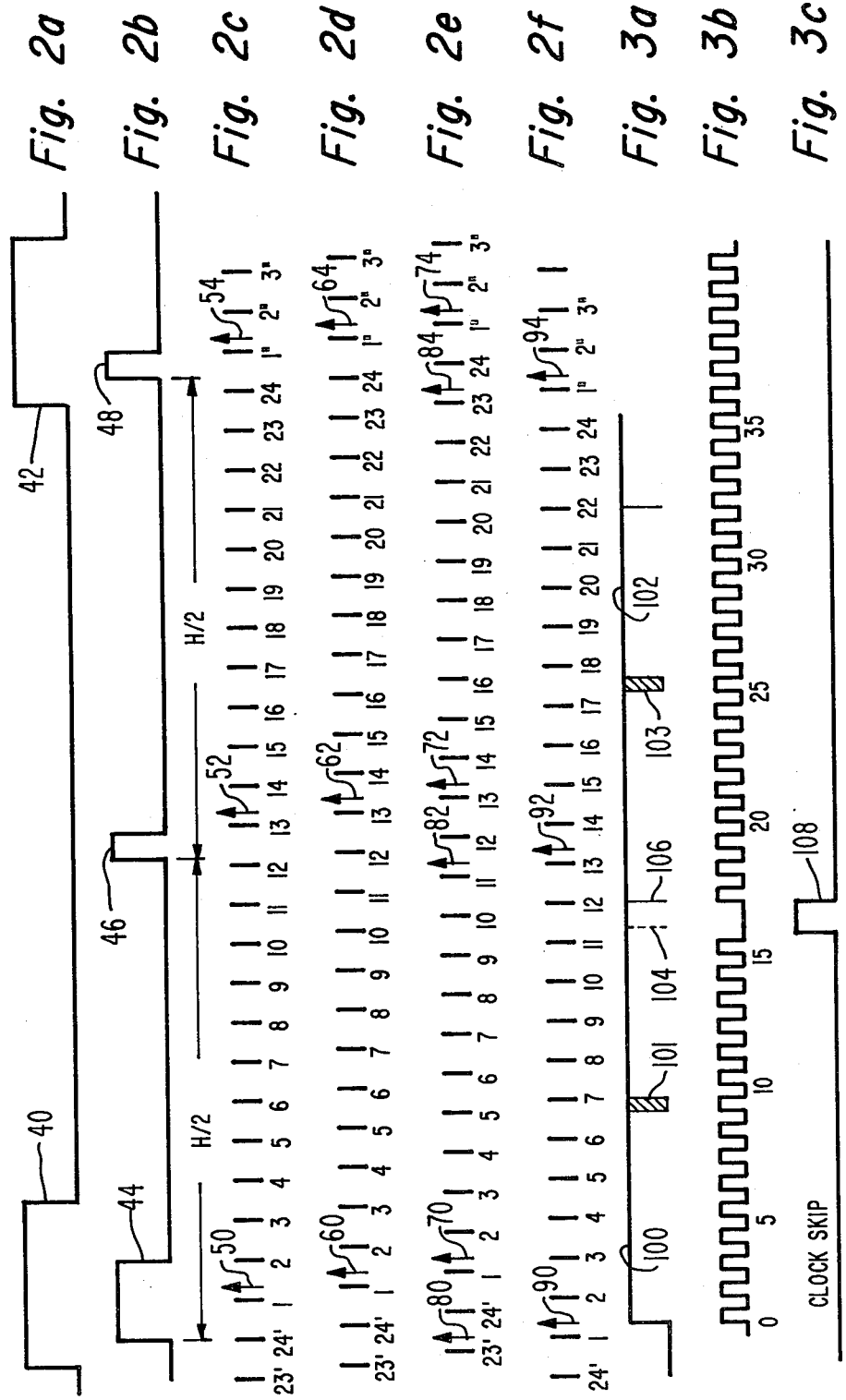

METHOD AND APPARATUS FOR OPERATING A MICROPROCESSOR IN SYNCHRONISM WITH A VIDEO SIGNAL

This invention relates to a method and apparatus for locking the timing of a microprocessor to a video signal and, in particular, to a method and apparatus for aligning the timing of a microprocessor with the synchronizing pulses of a video signal to establish a real time reference with respect to a video frame.

It is frequently desirable to align the timing of a microprocessor (or microcomputer; the terms are frequently used interchangeably) to the timing of a video frame in a television receiver. When the microprocessor timing is so aligned, the microprocessor can establish a real time reference with respect to a video frame, and will be able to predict in advance the occurrence of synchronous events in the video signal. The microprocessor is then able to gate the video signal at appropriate times for specified signal processing functions. For instance, by knowing a real time reference of the video signal, lines can be counted and gated at the time of occurrence of, for instance, the VIR signal on line nineteen, or teletext information on lines fourteen and fifteen. By sampling the video signal at precisely known times it is also possible to extract synchronous information, such as the burst signal or a training signal for ghost detection. The extracted information can then be processed by the microprocessor or other signal processing circuits.

In accordance with the principles of the present invention, a microprocessor is provided which is responsive to a clock signal which is phase locked to a synchronizing signal component of a composite video signal. The clock signal frequency is desirably chosen to be an integer multiple of the horizontal line rate and to enable the microprocessor to execute an integer number of instructions in the time interval of one horizontal line. By counting instructions, the microprocessor can count whole and fractional line intervals and predict the occurrence of any synchronously occurring event within a video line interval. The clock signal for the microprocessor is developed by a phase-locked loop which produces a clock signal in phase synchronism with a horizontal line rate signal.

Once the microprocessor is clocked to execute instructions in synchronism with the horizontal line rate signal, it is desirable to cause the instructions to be executed in a real time phase alignment with respect to the start of each horizontal line of the video signal. In accordance with a further aspect of the present invention, real time alignment of the execution of instructions with the horizontal rate signals is accomplished by executing sampling instructions. These instructions sample the composite sync signals to detect the presence of sync pulses. When a sample fails to detect a sync pulse, a clock pulse is deleted at the microprocessor clock input during a video field. In this way, the phase of the sampling instructions is shifted by one clock cycle each field relative to the sync signals until the sampling instructions are brought into a known phase relationship with the sampled sync signals.

Once the microprocessor is executing instructions in both phase and frequency synchronism with a known location of each horizontal line interval, it is desirable to identify one or more specific lines to provide a real time reference in each television signal frame. This is done in accordance with the principles of the present invention by sampling each line of the composite sync signal at half-line intervals until a half-line rate (equalizing) pulse is detected. A sequence of half-time rate pulses is then counted to identify the last broad vertical synchronizing pulse of the second (even) field, which establishes a real time reference which identifies different frames and fields of the video signal. From this reference, the microprocessor can count horizontal rate pulses to identify any specific line or line portion of the video signal.

In the drawings:

FIG. 1 illustrates in block diagram form, apparatus constructed in accordance with the principles of the present invention for locking the timing of a microprocessor to a video signal;

FIG. 2a, part of the timing diagram comprising FIGS. 2a–2f, shows a horizontal blanking pulse signal;

FIG. 2b shows a horizontal sync pulse followed by two equalizing pulses;

FIG. 2c shows the occurrence of microprocessor instruction cycles in a first phase relationship with the composite sync signal during the interval encompassing the waveform portion of FIG. 2b;

FIG. 2d shows the occurrence of microprocessor instruction cycles in a second phase relationship therewith;

FIG. 2e shows the occurrence of microprocessor instruction cycles in a third phase relationship therewith;

FIG. 2f shows the occurrence of microprocessor instruction cycles in a fourth phase relationship therewith;

Figure 1:
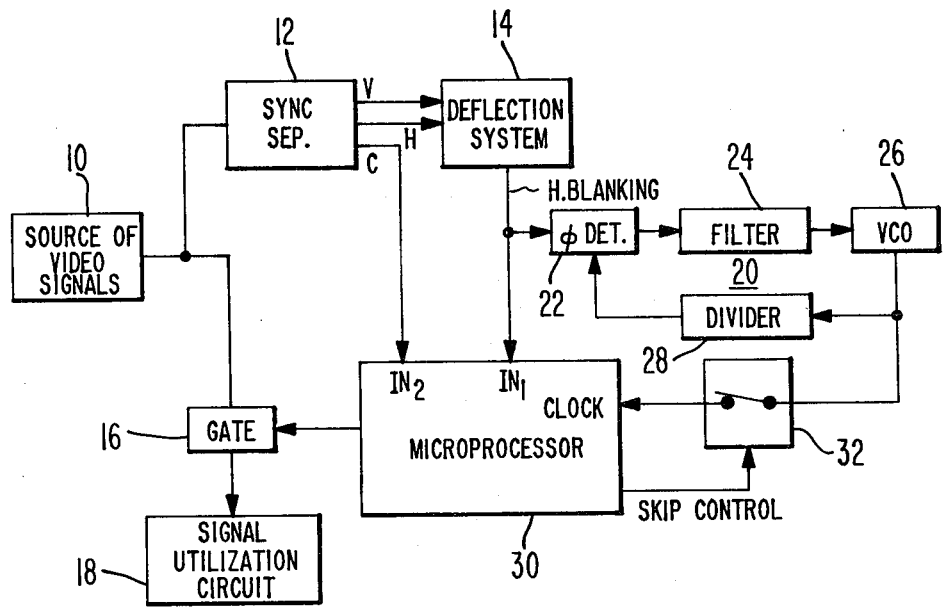
Figure 6:
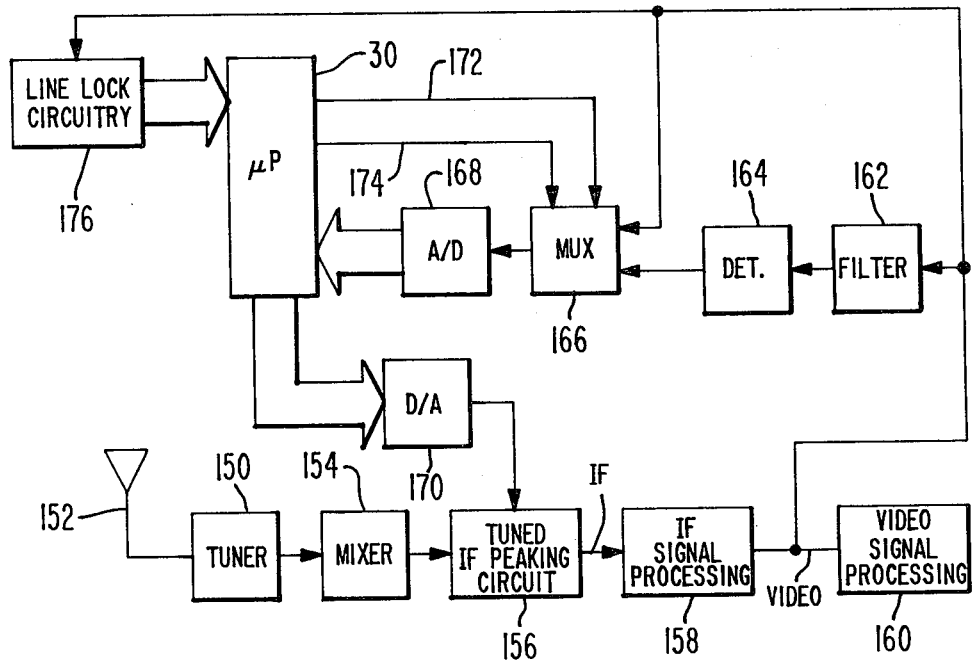
Figures 4, 5:
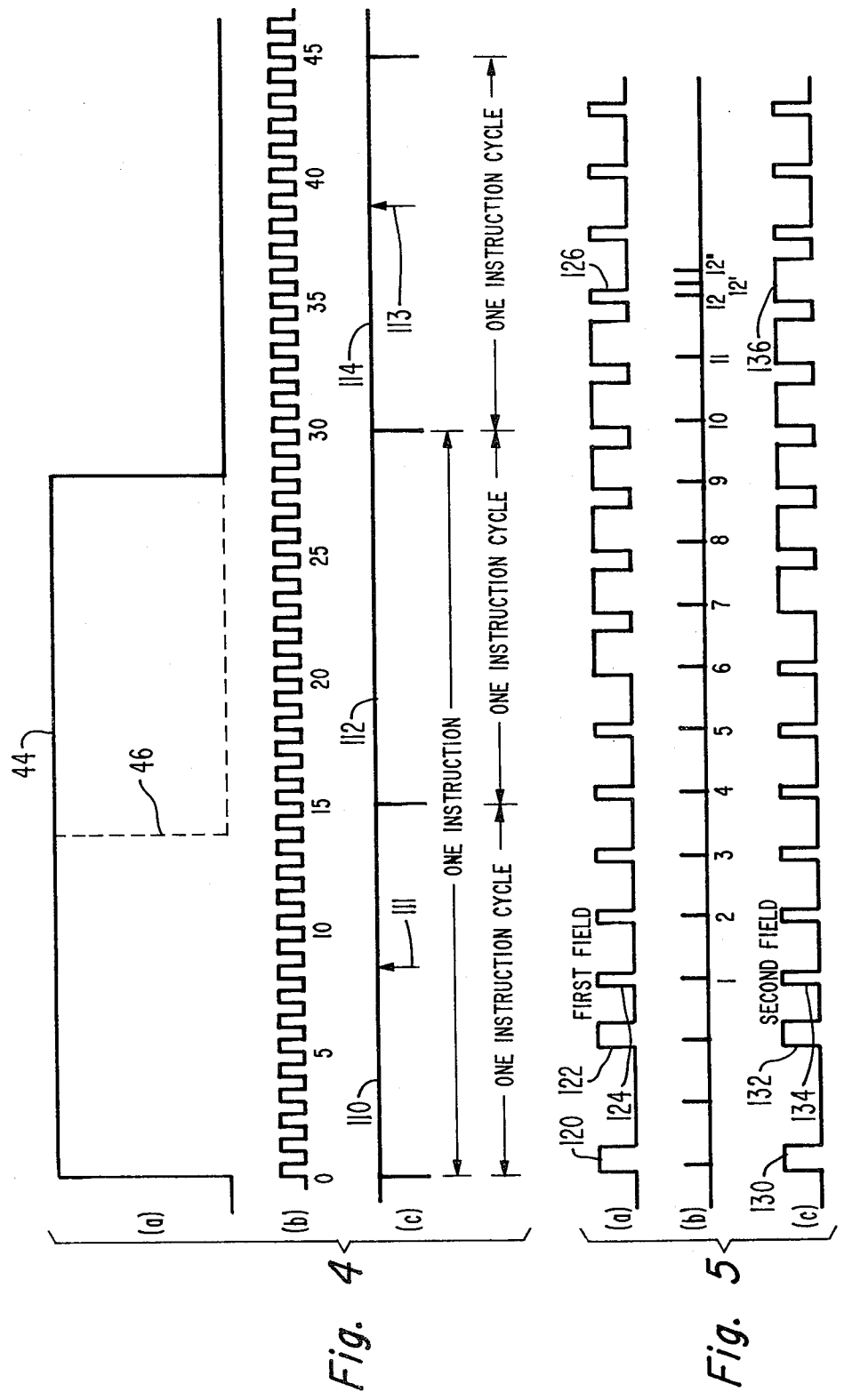
Figure 7:
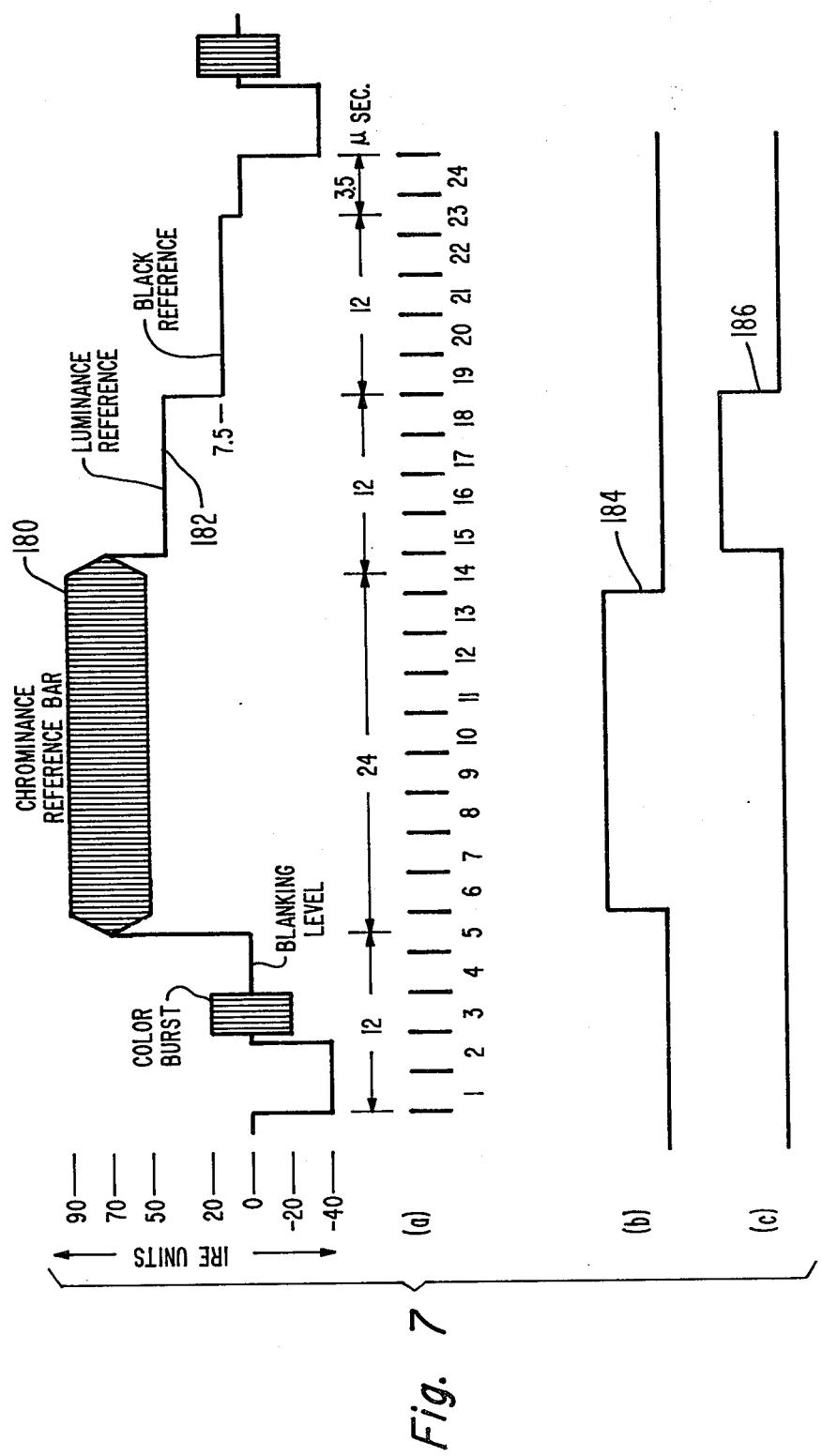

FIG. 3a, part of the timing diagram of FIGS. 3a–3c shows a number of microprocessor instruction cycles, with the duration of the first instruction cycle being lengthened by the performance of clock skipping in accordance with an aspect of the invention;

FIG. 3b shows microprocessor clock pulses, with the clock pulse after pulse 15 being skipped;

FIG. 3c shows the clock skip signal applied along the skip control line of FIG. 1;

FIG. 4, shows the duration of a horizontal sync pulse and an equalizing pulse; b shows microprocessor clock pulses and c shows instruction cycles and the occurrence of sampling instants within these cycles;

FIG. 5 shows waveforms illustrating a method of providing a real time video frame reference for the microprocessor of FIG. 1;

FIG. 6 shows apparatus constructed in accordance with the principles of the present invention for sampling a VIR signal to control the I.F. passband response of a television receiver; and FIG. 7 shows waveforms depicting the operation of the apparatus of FIG. 6.

Figure 8:
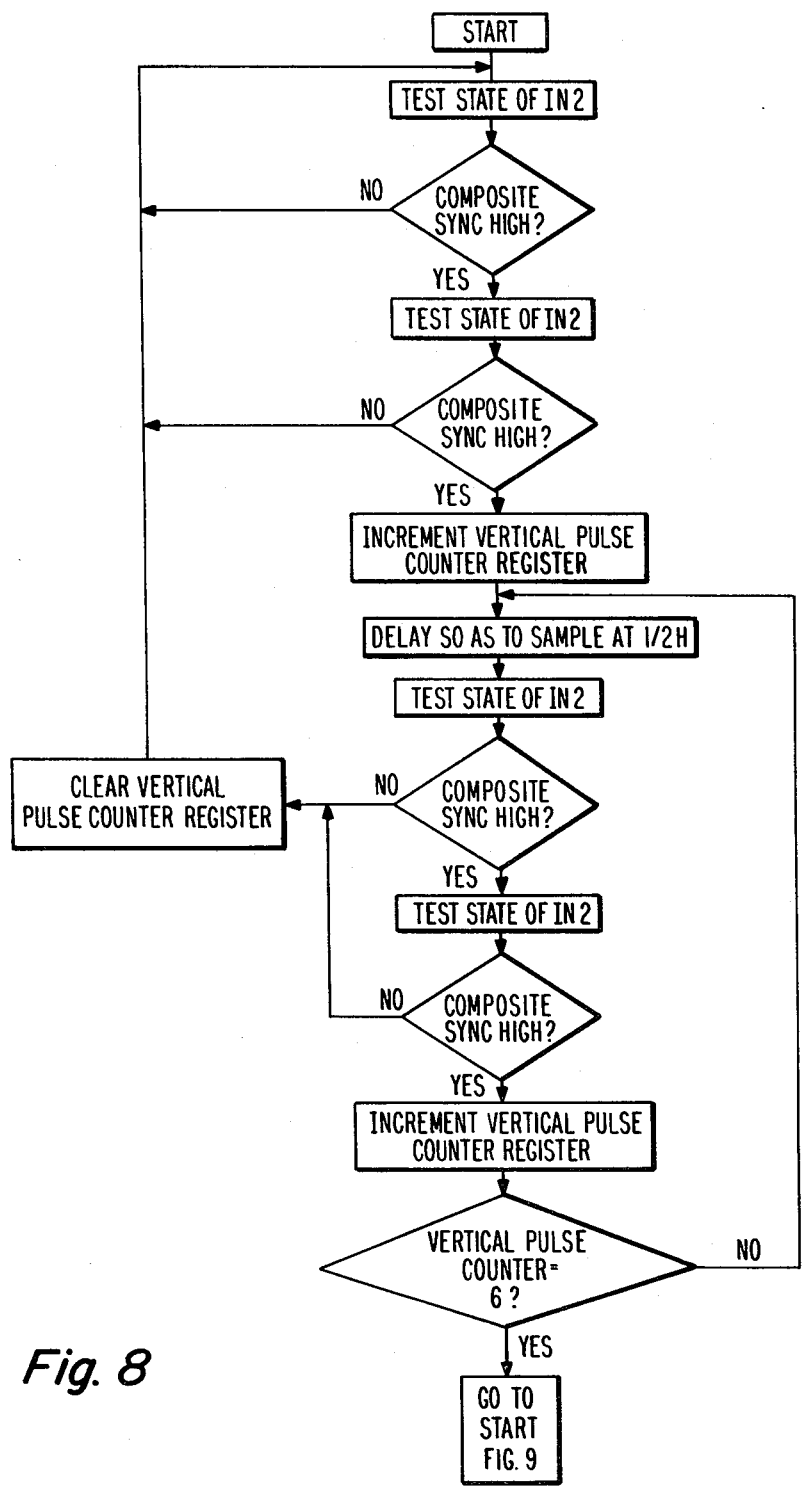
Figure 9:
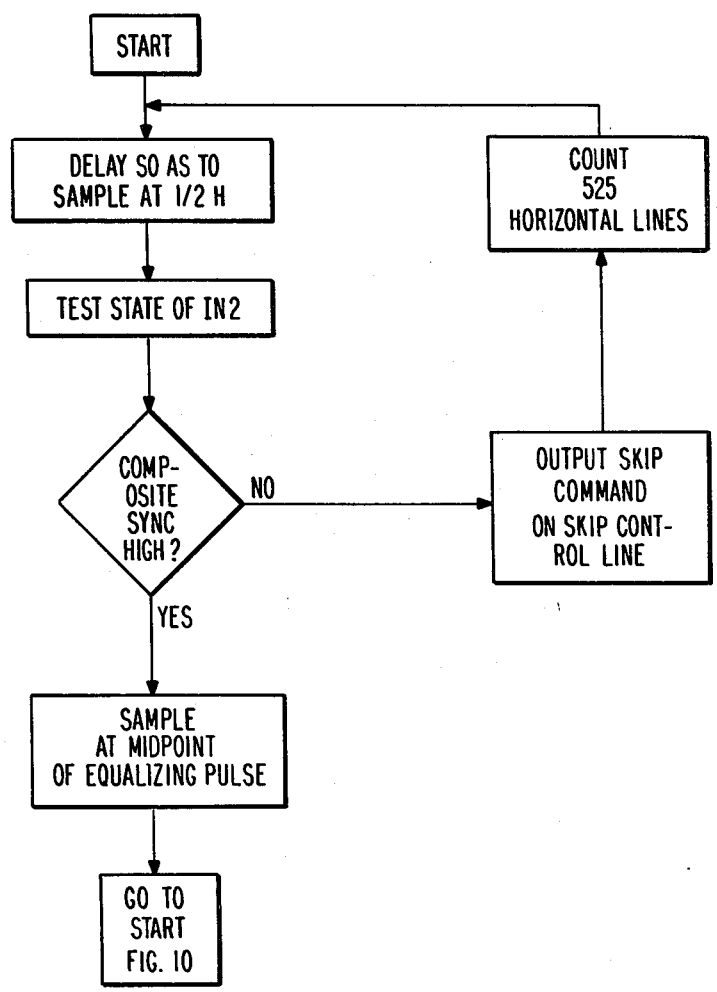
Figure 10:
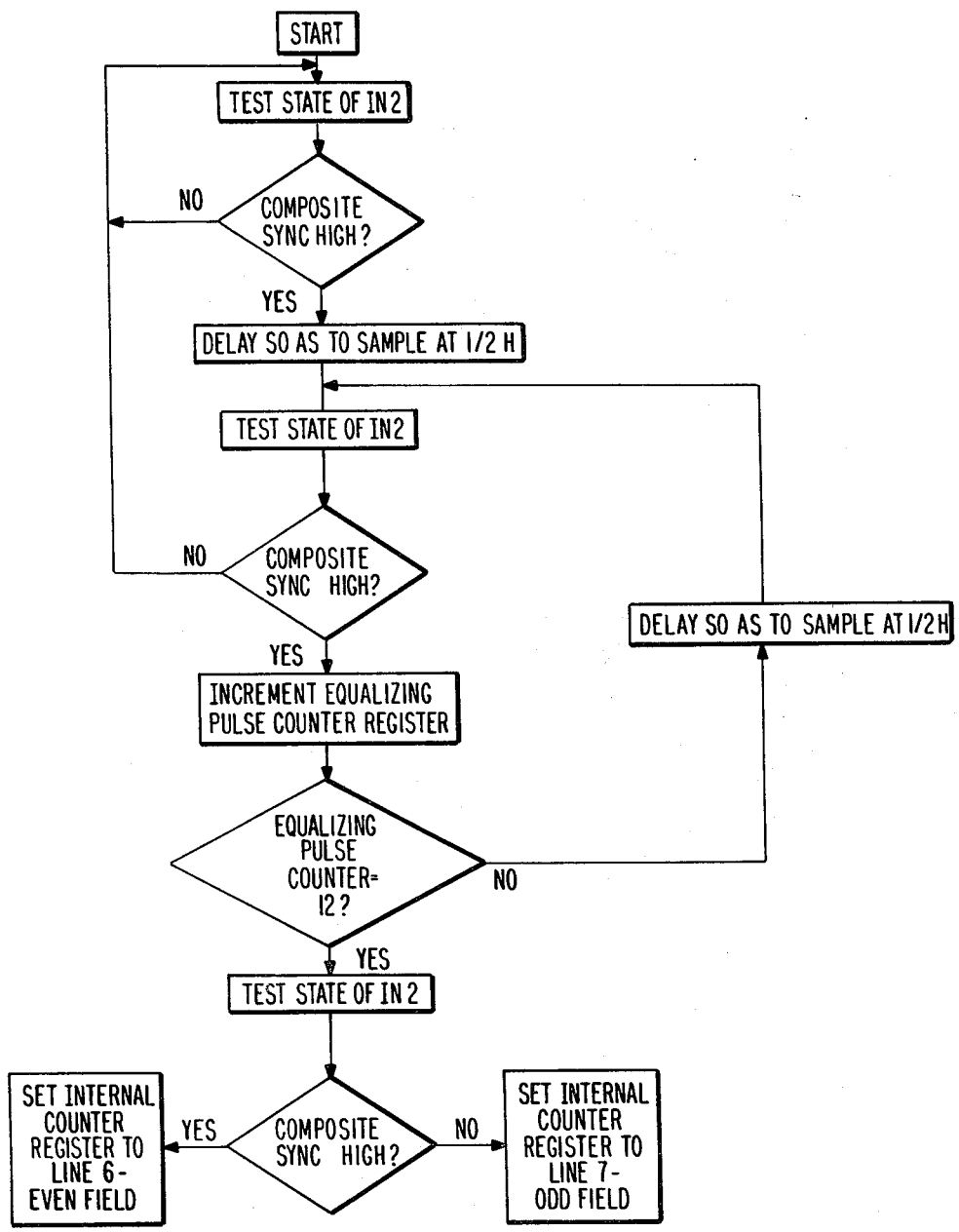

FIG. 8 shows the flowchart of a program that samples the composite sync waveform to identify the vertical synchronizing portion;

FIG. 9 shows the flowchart of a program that shifts or delays the execution of sampling instructions so as to align the sampling instants with the occurrence of the equalizing pulses of the composite sync waveform; and FIG. 10 shows the flowchart of a program that establishes a real time reference in the video field.

Referring to FIG. 1, apparatus is shown for synchronizing the operation of microprocessor 30 to a video signal in accordance with the present invention. A source of video signals 10, such as a television video detector, produces video signals which are applied to the inputs of a gate 16 and a conventional synchronization signal separator circuit 12. The sync separator 12 produces vertical, horizontal and composite (i.e., horizontal, vertical and equalizing) sync signals at respective outputs. The vertical and horizontal sync signals are applied to a conventional television deflection system 14. The deflection system provides horizontal blanking signals at an output, which may, for instance, be derived from the yoke of the kinescope in the usual manner. The horizontal blanking signals and the composite sync signals are applied to data inputs $IN_1$ and $IN_2$ of the microprocessor 30. The microprocessor 30 operates in a manner to be described in accordance with instructions stored in a program memory. The horizontal blanking signals are also applied to an input of a phase detector 22, the output of which is coupled by a filter 24 to the control input of a voltage controlled oscillator 26. The output of the voltage controlled oscillator 26 is coupled to a divider 28, and to the CLOCK input of the microprocessor 30 by way of a switch 32. The output of the divider 28 is coupled to a second input of a phase detector 22. The phase detector 22, the filter 24, the voltage controlled oscillator 26 and the divider 28 are coupled in a phase-locked loop configuration 20, and operate to produce a clock signal for the microprocessor which is in a substantially constant phase relationship with the horizontal blanking signal.

The microprocessor 30 has a SKIP CONTROL output line coupled to the switch 32. Pulses produced by the microprocessor 30 on this line act to open the normally closed switch 32. The microprocessor also has an output coupled to the gate 16 to control the conductivity of the gate. The gate 16 has an output coupled to a signal utilization circuit 18.

The operation of the arrangement of FIG. 1 may be understood with reference to the following example, taken in conjunction with the illustrative waveforms of FIGS. 2–5. For purposes of this example, it is assumed that the microprocessor used is a model number 8748, manufactured by Intel and other companies. The voltage controlled oscillator 26 is assumed to have a nominal operating frequency of 5.66435 MHz, and the divider 28 divides this clock frequency by 360 in the phase-locked loop 20. The model 8748 microprocessor 30 executes one instruction cycle every fifteen clock cycles, as shown by reference to FIGS. 4b and 4c. The model 8748 microprocessor is capable of sampling the signals at its data inputs $IN_1$ and $IN_2$ by executing a two-cycle sampling instruction 110,112, as shown by FIG. 4c. The sampling instruction samples the signal level at a selected input at a time indicated by the sampling arrow 111 of FIG. 4c with reference to the microprocessor clock waveform of FIG. 4b. At the selected clock frequency of 5.66435 MHz, the 8748 microprocessor will execute 24 single-cycle instructions during the time interval of one horizontal line.

When the system of FIG. 1 is activated, the phase-locked loop derived clock will enable the microprocessor 30 to execute an integer number of single-cycle instructions in one television horizontal line interval. For an NTSC color line interval of 63.555 microseconds, twenty-four instructions of 2.648 microsecond durations will be executed every line interval in this example. If a black-and-white or non-standard signal line interval of different duration is received, the phase-lock loop 20 will adjust the clock frequency to continue the execution of an integer number of instructions each line interval. However, the instructions will be executed in a phase relationship with respect to the beginning of each line which is random at initiation. The microprocessor will then sample the composite sync signal and perform the clock skipping technique of the present invention in order to align the phase of the instruction cycles with the video signal. A real time reference to each horizontal line is thereby established.

The clock skipping technique overcomes the inherent limitation of the microprocessor of only being able to accurately sample the video signal at sampling instruction intervals which are widely separated in time with respect to the duration of the signals being sampled. In the 8748 microprocessor, for instance, input signals can be sampled only as often as once every 5.3 microseconds, which is twice the instruction cycle time of 2.648 microseconds. Depending upon the phase relationship of the sampling times and the composite sync signal, it is possible for a 2.4 microsecond equalizing pulse to occur between two sampling times. By using the method of the present invention, this limitation can be overcome and the instruction cycles will be quickly aligned in a known phase relationship with the composite sync signal.

When the system of FIG. 1 is activated, the microprocessor begins to execute a program that samples the composite sync waveform to identify the vertical synchronizing portion. The flowchart for this program is illustrated in FIG. 8. The program begins by executing a sequence of two-cycle sampling instructions to sample the composite sync signal at data input $IN_2$. The composite sync signal contains horizontal, equalizing, and vertical sync pulses which, in the NTSC system, have pulse durations of approximately 5, 2.4 and 27 microseconds, respectively. Since the sampling times occur every 5.3 microseconds, only the vertical sync pulses will be sampled by two or more consecutive sampling times; the horizontal sync and equalizing pulses are too short to be sampled by two consecutive sampling periods. When the microprocessor has detected a pulse by detecting a "high" condition for two consecutive sampling times, for instance, it will execute the next sampling instruction at a time delayed from the first of the two samples by one-half line interval. Consecutive sampling instructions will again be executed to identify the next vertical sync pulse in the same manner. This sampling technique will continue until the microprocessor has identified the six consecutive vertical sync pulses of the vertical retrace interval. If six vertical sync pulses are not identified, which could occur, for instance, if the sampling sequence begins with the second or subsequent vertical sync pulse, the microprocessor will continue to sample the composite sync signal every 5.3 microseconds until the vertical sync pulse sequence is encountered during the next vertical retrace interval. Once the sequence of six vertical sync pulses has been identified by this technique, the first of the two consecutive instructions which samples the last vertical sync pulse becomes a time reference for the microprocessor which is near the beginning of a half-line interval of the composite sync signal. From this time reference, the microprocessor can sample at half-line intervals to attempt to identify the equalizing pulses of the composite sync signal.

With the microprocessor sampling instruction timing referenced as described above, the microprocessor 30 will now begin to execute a program that shifts or delays the execution of sampling instructions so as to align the sampling instants with the occurrence of the equalizing pulses of the composite sync waveform. The flowchart for this program is illustrated in FIG. 9. The program begins to sample the composite sync signal at half-time intervals, as shown in FIGS. 2b and 2c. FIG. 2b shows a horizontal sync pulse 44 followed at half-line intervals by equalizing pulses 46 and 48, a pattern which occurs at each transition from an even field to an odd field. FIG. 2c shows instruction cycles of the microprocessor drawn in the same time scale as the composite sync waveform of FIG. 2b. Sampling times 50, 52 and 54 are represented by arrows, and occur during the first, thirteenth and first instruction cycles, respectively, which are one-half line apart in time. In this example, the horizontal sync pulse 44 will be detected at sampling time 50 but the phase relationship of the microprocessor sampling times and the composite sync waveform of FIG. 2b results in the inability of the microprocessor to detect equalizing pulses 46 and 48. The illustrated phase relationship also causes subsequent equalizing pulses to be missed by the sampling times. The microprocessor will respond to this loss of signal samples by producing a CLOCK SKIP pulse 108 on the SKIP CONTROL line during the vertical retrace interval, which is shown in FIG. 3c. The CLOCK SKIP pulse 108 opens switch 32 for one cycle of the microprocessor clock, as illustrated by the missing clock cycle after clock cycle 15 in FIG. 3b. Since each instruction cycle requires fifteen clock pulses, the missed clock cycle will extend the time of instruction cycle 100 of FIG. 3a by one clock interval. Instruction cycle 100 will effectively last for sixteen clock cycles, and the following instruction cycle 102 will begin as shown at 106 instead of the normal time 104. Thus, instruction cycle 102 and all subsequent instruction cycles are delayed, or shifted in phase by one clock cycle relative to the composite sync signal. The microprocessor will now sample the composite sync waveform with this new phase of sampling times. If the microprocessor again fails to sample the equalizing pulses, a clock cycle will be skipped and the phase of the sampling times will move later in time relative to the composite sync signal, as shown by sampling times 60, 62 and 64 of FIG. 2d, all of which are seen to be shifted in time relative to corresponding sampling times 50, 52 and 54 of FIG. 2c.

The microprocessor continues to sample the composite sync signal and to skip clock cycles in this manner until the sampling time which is concurrent with the horizontal sync pulse 44 approaches the falling edge of the pulse, as shown by sampling time 70 of FIG. 2e. Subsequent clock cycle skips will cause corresponding sampling times to miss the horizontal sync pulse 44. However, these phase shifts will cause the preceding sample 80 to sample the horizontal sync pulse 44 in the vicinity of its leading edge. When this happens, the microprocessor's instruction reference will increment by two to establish the instruction cycle containing sampling time 80 to be the first instruction cycle of the line, instead of the twenty-third of the previous line. After a few more clock cycle skips, this sampling time will have shifted in phase relative to the composite sync signal to a time position 90, as shown in FIG. 2f. In this phase relationship, half-line sample 92 is now in a time position to sample equalizing pulse 46, and the next sampling time 94 will sample equalizing pulse 48. The microprocessor sampling times are now aligned in phase with the composite sync signal of FIG. 2b so that all sync pulses will be sampled. In practice, a fine adjustment of the phase relationship is performed so that the equalizing pulses are continuously sampled at their midpoints. It has been found that this clock skip and phase shift technique will quickly align the sampling times with composite sync signal. Experiments have shown that analysis of no more than thirty fields is necessary to arrive at the desired alignment from any initial phase condition.

The clock skipping technique is advantageously used with microprocessors such as the model 8748 which are designed to easily execute this function. It may be seen from FIG. 3 that the effect of the clock skip in this example is to lengthen the real time required to execute an instruction from 2.648 microseconds to 2.825 microseconds. The phase relationship of subsequent 2.648 microsecond instructions is thereby shifted relative to the incoming sync signals. The same phase shift can be accomplished in software without the clock skip by selectively executing an instruction which has an execution time longer than the nominal 2.648 microsecond instructions. For instance, if the microprocessor is capable of executing another type of instruction in 16, 17, 18, etc. clock cycles, one of these instructions could be executed to provide a phase shift of the timing of the 2.648 microsecond instructions relative to the sync signals. This permits implementation of the principles of the present invention using a microprocessor which does not include the clock skipping feature.

When the sampling times have been properly aligned in phase with the composite sync signals, any desired portion of a line may be sampled by sampling during the appropriate instruction cycle or cycles. Lines may be counted by counting the horizontal blanking pulses 40 and 42 of FIG. 2a, which are applied to data input IN$_1$ of the microprocessor 30. However, in order to sample a specific numbered line, such as line nineteen of each field (the VIR line), it is necessary to establish a real time reference in the video fields. This may be done by executing the program illustrated in flowchart form in FIG. 10. In executing the program the composite sync signal is sampled at half-line intervals, as illustrated by the waveforms of FIG. 5.

FIG. 5a shows the composite sync signal waveform at the beginning of an odd (first) field. This waveform is sampled at the sampling times shown in FIG. 5b. The horizontal sync pulse 120 is the last horizontal sync pulse of the preceding even-numbered field, and is followed by an equalizing pulse 122, one line interval later. The next pulse which is detected is equalizing pulse 124, occurring one-half line interval after pulse 122. Since only a half-line interval has passed between these two signals, the sample time of pulse 124 is counted as "one". Half-line samples are now counted until a count of "twelve" is reached six lines later, at which time equalizing pulse 126 following the vertical sync pulse interval is being sampled. The composite sync waveform is now sampled for a number of consecutive instructions, as indicated by sample times 12' and 12". The narrow width of equalizing pulse 126 allows this pulse to be sampled only by the first sampling time 12, and samples 12' and 12" will find the composite sync waveform to be in a "low" state. The microprocessor now knows that it has identified line seven of an odd video field.

This result may be checked at the start of the following even field, shown in FIG. 5c. The odd (first) field ends with horizontal sync pulses 130 and 132. Sync pulses 132 is followed one-half line later by an equalizing pulse 134. As in the previous field, the half-line occurrence of two pulses sets the sample counter of the microprocessor to a "one". Half-line samples are now counted until a count of "twelve" is again attained. At the count of twelve, the microprocessor will now be sampling the last broad vertical pulse of the even field. Subsequent consecutive samples 12' and 12" will also detect the broad vertical pulses 136, identifying this pulse 136 as a part of line six of an even field. The microprocessor now has a real time reference in the video signal, and can identify odd and even fields, as well as specific lines in each field by counting the horizontal blanking pulses at input IN₁. The microprocessor can gate any specific line to the utilization circuit 18 merely by counting an appropriate number of horizontal blanking pulses and opening gate 16 at the appropriate count. Furthermore, the microprocessor can sample at any specific time of a particular line by executing one or more skips of cycles of the clock signal. These clock skips effectively shift the phase of the sampling instructions into alignment with the time of the line which is to be sampled. The microprocessor can count the clock skips so as to continue to maintain a real time reference of the sampling times with respect to the video signal.

The arrangement of FIG. 1 may be configured as shown in FIG. 6 to sample a VIR signal. The VIR signal samples may then be used, for instance, to control the I.F. passband of the television receiver, as described in U.S. patent application Ser. No. 258,928, entitled "I.F. RESPONSE CONTROL SYSTEM FOR A TELEVISION RECEIVER", filed Apr. 30, 1981, now U.S. Pat. No. 4,366,498. In the system there described, the chrominance reference bar and the luminance reference level of the VIR signal are detected and compared to develop a control signal which is used to peak the I.F. passband in the vicinity of the picture or chrominance carrier frequency. The basic elements of this system as shown in FIG. 6, in which a conventional television receiver system, including an antenna 152, a tuner 150, a mixer 154, I.F. signal processing circuitry 158, and video signal processing circuitry 160 are shown connected in the usual manner. Disposed between the mixer 154 and the I.F. signal processing circuitry 158 is a tuned I.F. peaking circuit 156 which may be constructed as shown in the serial number 258,928 application. The detected video signal at the output of the I.F. signal processing circuitry 158 is applied to a filter 162, an input 165 of a multiplexer 166, and line lock circuitry 176. The line lock circuitry 176 includes elements 12, 14, 20 and 32 of the arrangement of FIG. 1, and is coupled to microprocessor 30 as shown in that FIGURE. The multiplexer 166 is controlled by signals applied to control lines 172 and 174 by the microprocessor 30. The output of the filter 162 is coupled to the input of a detector 164, the output of which is coupled to a second input of the multiplexer 166. The output of the multiplexer 166 is coupled to the microprocessor 30 by way of an analog to digital converter 168. The microprocessor develops a digital output signal, which is coupled to the inputs of a digital to analog converter 170, the output of which is coupled to the control input of the tuned I.f. peaking circuit 156.

In operation, the microprocessor timing is aligned with the composite sync signal of the video signal as illustrated in FIGS. 2-5. The microprocessor 30 will count the lines of the video signal to locate line nineteen, which may contain a VIR signal. A typical VIR signal is shown in FIG. 7a. Following the conventional horizontal sync pulse and burst signal, the VIR signal includes a 24 microsecond chrominance reference bar 180, followed by a twelve microsecond luminance reference level 182. During line nineteen, the microprocessor instructions are aligned with the VIR signal as illustratively shown in FIG. 7a. During instruction cycle six, the microprocessor 30 will initiate a sampling interval pulse on control line 172, shown as pulse 184 in FIG. 7b. The microprocessor terminates pulse 184 during instruction cycle 13. During sampling interval pulse 184, the detected chrominance reference bar level at the output of detector 164 is routed to the A/D converter 168 by the multiplexer 166. The detected signal level is converted to a digital signal and stored by the microprocessor 30.

During instruction cycle 15 of line nineteen, a second sampling interval pulse 186 is initiated by the microprocessor on control line 174. The microprocessor terminates pulse 186 during instruction cycle 19. Sampling interval pulse 186 controls the multiplexer to route the luminance reference level at multiplexer input 165 to the A/D converter 168. The luminance reference level is digitized and stored by the microprocessor 30.

The microprocessor 30 can now compute a control signal value for the tuned I.F. peaking circuit 156. The two stored signals may be analyzed for validity and noise contamination and a control signal will be calculated in accordance with the ratio of the two signals. The digital control signal value is applied to the D/A converter 170, where it is converted to an analog signal and applied to the tuned I.F. peaking circuit 156. Control of the I.F. passband of the television receiver will then proceed as described in the Ser. No. 258,928 application.

What is claimed is:

1. In a television receiver, including a source of video signals including synchronizing signal components, and a synchronizing signal separator circuit responsive to said video signals for producing separated horizontal line rate synchronizing signals, apparatus comprising:
    a microprocessor having a clock input for receiving a clock signal, a data input coupled to receive said synchronizing signals, and an output at which a control signal is produced, said microprocessor being capable of executing a program of instructions, the execution of an instruction cycle taking a given number of clock signal cycles;
    means having an input coupled to receive said synchronizing signals and an output for producing a clock signal which is substantially aligned in phase with said synchronizing signals;
    means for coupling said output of said clock signal producing means to said clock input of said microprocessor, the frequency of said clock signal being chosen as an integer multiple of said horizontal line rate for enabling said microprocessor to execute an integer number of instruction cycles during a horizontal line interval to sample the state of said data input synchronously with said synchronizing signals; and
    a signal utilization circuit coupled to said output of said microprocessor.

2. The arrangement of claim 1, wherein said microprocessor is further responsive to said clock signal for executing an instruction during a time interval which is greater than the duration of said given number of uniform clock signal cycles, whereby the phase of subsequently executed instruction cycles is shifted relative to the phase of said horizontal line rate synchronizing signals.

3. The arrangement of claim 1, wherein ones of said instruction cycles cause the execution of sampling instructions for sampling the level of said synchronizing signals at said data input of said microprocessor at predetermined times; said means for coupling said output of said clock signal producing means comprises a controlled switch; and said microprocessor further includes a skip control output terminal coupled to said controlled switch for opening said switch in response to a skip control signal generated by said microprocessor in accordance with said sampled levels of said synchronizing signals, whereby subsequent sampling instructions are executed in a phase relationship with said synchronizing signals.

4. The arrangement of claims 1, 2 or 3, wherein said clock signal producing means comprises a phase locked loop including:
  means including a phase detector having a first input coupled to receive said synchronizing signals, a second input, and an output;
  a voltage controlled oscillator having an input coupled to said output of said phase detector, and an output coupled to said means for coupling said output of said clock signal producing means for producing an output signal having a frequency which is substantially a multiple of the frequency of said synchronizing signals;
  a filter coupled between said phase detector and said voltage controlled oscillator; and
  a divider coupled between said output of said voltage controlled oscillator and said second input of said phase detector.

5. A method for aligning the timing of a microprocessor to synchronously sample a signal synchronously related to a video signal, comprising the steps of:
  (a) producing a synchronizing signal in response to said video signal;
  (b) producing a clock signal in response to said synchronizing signal which exhibits a frequency which is a multiple of the frequency of said synchronizing signal and which is in substantial phase alignment therewith;
  (c) applying said clock signal and said signal synchronously related to a video signal to a clock port and an input port respectively, of said microprocessor;
  (d) programming said microprocessor to execute an integer number of instruction cycles during an integer number of periods of said synchronizing signal in response to said clock signal; and
  (e) sampling said synchronously related signal at said input port of said microprocessor, said sampling being performed synchronously with said synchronizing signal.

6. The method of claim 5, wherein step (a) comprises the step of:
  (a) producing a synchronizing signal containing horizontal line rate components in response to said video signal; and further comprising the steps of:
  (e) sampling said synchronizing signal at a horizontal line rate to detect said horizontal line rate components;
  (f) if a component is not detected, preventing the application of a cycle of said clock signal to said microprocessor; and
  (g) repeating steps (e) and (f) until said horizontal line rate components are continuously detected at said horizontal line rate.

7. The method of claim 5, wherein step (a) comprises the step of:
  (a) producing a synchronizing signal containing horizontal sync pulses and equalizing pulses in response to said video signal; and further comprising the steps of:
  (e) sampling said synchronizing signal at half-line intervals to detect the presence of said equalizing pulses and, if no equalizing pulses are detected during the time interval of a video field,
  (f) preventing the application of a cycle of said clock signal to said microprocessor; and
  (g) repeating steps (e) and (f) until said equalizing pulses are detected each video field.

8. The method of claim 7, wherein step (a) comprises:
  (a) producing a composite sync signal in response to said video signal; and further comprising the steps of:
  (h) sampling said composite sync signal at half-line intervals until pulses are detected by two consecutive samples, then
  (i) sampling said composite sync signals, after a period of eleven half-line intervals, for n consecuting sampling instructions, where n is greater than one and less than or equal to the duration of a vertical sync pulse divided by the execution time of a sampling instruction;
  (j) where a synchronizing signal pulse is detected by the nth sample, identifying that sample as the last broad vertical pulse of an even-numbered video field; and
  (k) where a synchronizing signal pulse is not detected by the nth sample, identifying the first of said n samples as the first equalizing pulse following the vertical synchronizing pulse interval of an odd-numbered video field.

9. A method for aligning the timing of a microprocessor to a real time reference in a frame of a video signal comprising the steps of:
  (a) producing a composite sync signal in response to said video signal;
  (b) producing a clock signal for said microprocessor in response to said video signal which is phase-locked to horizontal synchronizing signal components of said video signal;
  (c) programming said microprocessor to execute sampling instructions at intervals of half of one television line interval in response to said clock signal to sample said composite sync signal;
  (d) aligning said sampling instructions with the phase of the equalizing pulses of said composite sync signal so that said instructions sample said equalizing pulses when they occur;
  (e) sampling said composite sync signal at half-line intervals until pulses are detected by two consecutive samples, then
  (f) sampling said composite sync signal, after a period of eleven half-line intervals, for n consecutive samples during the time interval of a vertical sync pulse, where n is greater than one and less than or equal to the duration of a vertical sync pulse divided by the time between ones of said consecutive samples; and
  (g) where a synchronizing signal pulse is detected by the nth sample, identifying that sample as the last broad vertical pulse of an even-numbered video field, and (h) where a synchronizing signal pulse is not detected by the nth sample, identifying the first of said n samples as the first equalizing pulse following the vertical synchronizing pulse interval of an odd-numbered video field.

10. In a television receiver, including a source of video signals including synchronizing signal components, and a synchronizing signal separator circuit responsive to said video signals for producing separated synchronizing signals of a given frequency, apparatus comprising:

a microprocessor having a clock input for receiving a clock signal, said clock signal enabling said microprocessor to execute programmed instructions at a rate dependent upon the frequency of said clock signal;

a sampling input of said microprocessor;

means coupled to said source and to said sampling input for applying thereto a signal that is in synchronous relationship with said separated synchronizing signals;

means having an input coupled to receive said synchronizing signals and an output for producing said clock signal which is substantially aligned in phase with said synchronizing signals and has a frequency which is substantially an integer multiple of said synchronizing signal frequency; and means for coupling said output of said clock signal producing means to said clock input of said microprocessor to permit said microprocessor to synchronously sample the synchronously related signal at said sampling input.

11. A television, line-synchronized, programmable microprocessor based, sampling system, comprising:

a source of a line-synchronized information signal repeating at a line frequency, including a horizontal sync signal;

a microprocessor having a clock input for receiving a clock signal and capable of executing an instruction cycle upon application of a given number of cycles of said clock signal to said clock input, and having a data input for receiving said line-synchronized information signal, said microprocessor capable of sampling said line-synchronized information signal by executing an instruction which determines the state of said data input, and having a data output for providing a data signal based upon the sampling of said line-synchronized information signal;

means for generating said clock signal; and means responsive to said line-synchronized information signal for aligning said clock signal with said horizontal sync signal, wherein the frequency of said clock signal is established at a multiple of the line frequency to enable the microprocessor to execute instructions that causes the same point of said line-synchronized signal to be sampled in different lines.

12. A microprocessor based sampling system according to claim 11 wherein the frequency of said clock signal is selected as an integer multiple of the line frequency that enables said microprocessor to execute an integer number of instruction cycles during a line interval.

13. A microprocessor based sampling system according to claim 12 wherein said clock signal aligning means includes means responsive to a skip signal for deleting the application of a cycle of said clock signal to said microprocessor clock signal input.

14. A microprocessor based sampling system according to claim 13 including a skip control output of said microprocessor for generating said skip signal when said microprocessor executes an instruction to change the state of said skip control output.

15. A line-synchronized programmable microprocessor for a television processing system, comprising:

a source of a line-synchronizing signal repeating at a line frequency;

a microprocessor having a clock input for receiving a clock signal, said microprocessor capable of executing an instruction cycle upon application of a given number of cycles of said clock signal to said clock input;

means for generating said clock signal;

means responsive to said line-synchronizing signal and coupled to said clock signal generating means for synchronizing said clock signal with said line-synchronizing signal;

a skip output, the state of which is under microprocessor instruction control; and means coupled to said clock signal generating means and responsive to the state of said skip output as controlled by the programming of said microprocessor for deleting the application of a cycle of said clock signal to adjust the phasing of the execution of said instruction cycle relative to said line-synchronizing signal.

16. A line-synchronized microprocessor according to claim 15 including a second input of said microprocessor, which state thereof is capable of being determined by execution of instructions, and a source of a line-synchronized information signal coupled to said second input for being synchronously sampled by said microprocessor.

17. A line-synchronized microprocessor according to claim 16, wherein the state of said skip output is switched in a manner to enable a selected point in a line interval to be recurrently sampled.

18. A line-synchronized microprocessor according to claim 16 wherein the frequency of said clock signal is selected as an integer multiple of the line frequency that enables said microprocessor to execute an integer number of instruction cycles during a line interval.

* * * * *